DOMAIN PROPAGATION DEVICE

Filed April 1, 1968 3 Sheets-Sheet 1

INVENTORS: A. H. BOBECK
E. DELLA TORRE
H. E. D. SCOVIL

BY: Herbert M. Shapiro
ATTORNEY

United States Patent Office 3,530,444
Patented Sept. 22, 1970

3,530,444
DOMAIN PROPAGATION DEVICE

Andrew H. Bobeck, Chatham, Edward Della Torre, Plainfield, and Henry E. D. Scovil, New Vernon, N.J., assignors to Bell Telephone Laboratories, Incorporated, Murray Hill and Berkeley Heights, N.J., a corporation of New York Filed Apr. 1, 1968, Ser. No. 717,616
Int. Cl. G11c *11/14, 19/00*
U.S. Cl. 340—174 14 Claims

ABSTRACT OF THE DISCLOSURE

Patterns of high permeability wedges contiguous to orthoferrite sheet define in the sheet unidirectional channels for single wall domain movement in response to the alternating expansion and contraction of domains. The expansion and contraction of domains is produced by varying currents in hairpin conductors each encompassing a selected wedge pattern. Domain movement in only the selected channel results. Selected movement of domains in X and Y directions in the sheet is enabled.

FIELD OF THE INVENTION

This invention relates to domain propagation devices and more particularly to devices employing a magnetic medium in which magnetic domains such as single wall domains can be moved.

BACKGROUND OF THE INVENTION

A single wall domain is a magnetic domain having a magnetization different from that of surrounding material and being bounded by a single domain wall which closes on itself. A shift register employing single wall domains is described in the Bell System Technical Journal, volume XLVI, No. 8, October 1967, at page 1901 et seq.

Single wall domains are moved, usually, in a sheet of magnetic material by localized attracting fields generated at consecutively offset positions in the material. The fields are typically generated in a localized area having a geometry commensurate with that of the domain geometry. For example, a representative material suitable for the propagation of single wall domains is a rare earth orthoferrite such as thulium orthoferrite ($Tm\ FeO_3$). A sheet of material of this type is characterized by a preferred direction of magnetization (easy axis) normal to the plane of the sheet. We may adopt the convention that the sheet is saturated magnetically in a downward direction into the plane of the sheet or in what we may designate the negative direction and a domain has its magnetization directed upward out of the plane of the sheet in what we may designate the positive direction. A single wall domain is conveniently represented as an encircled plus sign in this context and the localized fields are generated by currents in conductors each having a commensurate loop shape. It is to be understood that a single wall domain need not be circular (in cross-section). A circular shape though is particularly convenient because it is easily established particularly in the presence of a uniform bias field in the sheet of a polarity to contract domains.

Copending application Ser. No. 710,031, filed Mar. 4, 1968 for A. H. Bobeck and R. F. Fischer, however, describes a domain propagation device where unidirectional channels for single wall domains are defined in a sheet of magnetic material by, for example, interconnected wedge-shaped overlays of high permeability materials in the absence of propagation conductors. A bias field of a polarity to contract domains is generated throughout the sheet and varied in amplitude to contract and expand domains in the sheet alternately. The overlay functions to convert the alternate contractions and expansions into net displacement along all channels simultaneously in the absence of loop-shaped propagation conductors.

The absence of loop-shaped propagation conductors permits an increase in packing density. The loop-shaped geometry of the propagation conductors, plus the necessity for a minimum cross-section for the conductors for carrying the requisite drive currents, along with the necessity for spacing domains apart in a propagation channel dictate about a ten mil minimum allocation for each bit loction in a domain propagation channel regardless of the size of domains. This is explained more fully in the above-mentioned copending application. Domains of submil size and even of micron size, however, would permit bit locations of little more than a mil or a few microns respectively in the absence of loop-shaped propagation conductors.

But the propagation conductors, when pulsed selectively, permit the selective movement of domains. In the absence of those conductors all domains are moved only synchronously, an operation most useful for mass serial memories such as drum or disk files.

BRIEF DESCRIPTION OF THE INVENTION

The present invention employs the wedge-shaped overlay of the last-mentioned application to convert alternate expansion and contraction of domains to net translation along domain propagation channels. But, in accordance with this invention the domains in only selected channels are alternately expanded and contracted. Consequently, selective movement of domains is enabled along with relatively high packing densities.

In an illustrative embodiment, a hairpin-shaped conductor is deposited about each domain propagation channel defined by a wedge-shaped, high permeability overlay. A varying current is applied to a selected hairpin conductor and only the domains in the channel encompassed by that conductor are alternately expanded and contracted. In another illustrative embodiment, hairpin-shaped conductors oriented perpendicularly with respect to one another encompass overlays on opposite surfaces of a sheet in which single wall domains are moved. Selective movement of domains in X and Y directions is enabled.

Accordingly, a feature of this invention is a propagation device for single wall domains including a sheet of magnetic material characterized by a preferred direction of magnetization out of the plane of the sheet, means for generating varying fields in selected regions of said sheet for alternately expanding and contracting domains there, and means defining in said sheet unidirectional channels for domains alternately expanded and contracted.

Another feature of this invention is a propagation device for single wall domains including a sheet of material in which single wall domains are moved, means defining in said sheet perpendicularly oriented unidirectional channels for single wall domains alternately expanded and contracted, and means for generating in selected ones of said channels varying fields for alternately expanding and contracting domains there.

DETAILED DESCRIPTION

Figure 1:
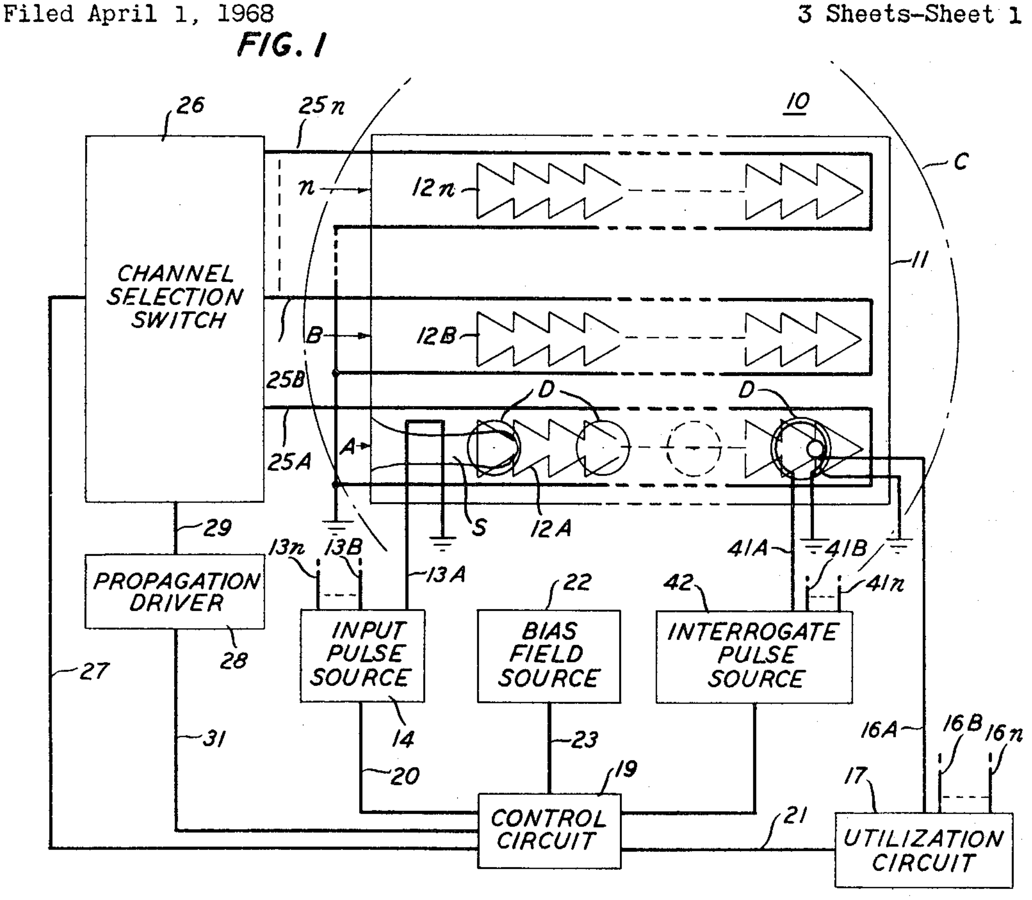
FIG. 1 is a schematic view of a memory in accordance with the invention.

FIG. 1 shows a domain propagation device 10 including a sheet or platelet 11 of, illustratively, thulium orthoferrite. Propagation channels A, B . . . *n* for single wall domains are defined in sheet 11 by overlay patterns 12*i* of interconnected wedge-shaped areas of magnetic material such as low magnetostrictive NiFe. The material of the overlay is characterized by a high permeability or by a low coercivity so that the magnetization of the overlay can be set by the external fields characteristic of a domain. The overlay patterns 12*i* are designated 12A, 12B . . . 12*n* to correspond to the channel designations.

Each overlay pattern extends across sheet 11 from input to output positions for domains. The input position is defined for channel A by a conductor 13A connected between an input pulse source 14 and ground. The output position is defined for channel A by a figure 8 conductor 16A connected between a utilization circuit 17 and ground. Similar conductor arrangements define input and output positions for the remaining channels. Pulse source 14 and utilization circuit 17 are connected to a control circuit 19 via conductors 20 and 21, respectively.

A bias field source indicated by block 22 generates a uniform magnetic field in sheet 11, illustratively, to maintain a preferred diameter for single wall domains in the sheet. The source conveniently comprises a coil (not shown) about sheet 11 oriented, as indicated by broken circle C, to generate a magnetic field normal to sheet 11 when activated. Source 22 is connected to control circuit 19 via conductor 23.

A plurality of hairpin conductors 25*i* encompass correspondingly designated overlay patterns. The hairpin conductors are connected between a channel select switch 26 and ground. The channel select switch is connected to control circuit 19 by conductor 27.

One or more hairpin conductors 25*i*, selected by switch 26, have signals applied thereto in a manner to generate a varying magnetic field in the corresponding channel. The resulting varying field powers the alternate expansion and contraction of domains only in the selected channels resulting in domain propagation there. To this end, switch 26 is connected to a propagation driver 28 by a conductor 29. Driver 28, in turn, is connected to control circuit 19 by a conductor 31.

The various sources and circuits may be any such elements capable of operating in accordance with this invention.

The arrangement of FIG. 1 operates as parallel and independent shift register circuits. Information is stored in a selected shift register, or propagation channel, as the presence (1) or absence (0) of a domain. The presence of domains in channel A in FIG. 1 is shown by encircled plus signs designated D. The absence of a domain is indicated by a broken circle. The illustrative stored information then is 11 . . . 0 . . . 1 as viewed from left to right in FIG. 1.

The movement of information in a selected channel from input to output position is synchronous and in response to the variations in the magnetic field generated by the signal in conductor 25A as is explained further hereinafter. The presence and absence of domains in the channel depend on the presence and absence of appropriately timed pulses in conductor 13A. For example, a pulse may be applied to conductor 13A each time the magnetic field is most strongly negative. The presence of a pulse at that time results in the replication (viz: separation) of a domain from a source S of positive magnetization into the input position of channel A for propagation.

Figure 2:
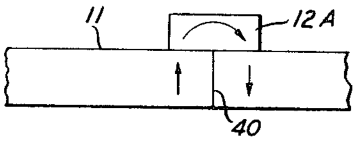
FIGS. 2, 3A, 3B, 3C, 4A, 4B, and 4C are schematic views of portions of the memory of FIG. 1 showing magnetic conditions therein during operation.

The varying magnetic field produces a cyclical expansion and contraction of all domains in channel A of sheet 11 and the overlay converts the resulting wall motion into a net displacement. FIG. 2 shows an imaginary portion of sheet 11 in cross-section. The magnetization of a domain in FIG. 2 is represented by the upward directed arrow and that of the remainder of the sheet is represented by the downward directed arrow. A domain wall is defined between the domain and the remainder of the material. We shall consider a portion 40 of that wall. A portion of pattern 12A is shown overlying wall 40 enabling flux closure therethrough. First consider a symmetrical overlay. A minimum energy condition is provided when wall 40 is positioned with respect to a symmetrical overlay pattern 12A such that as much effective material in pattern 12A is to the right as there is effective material to the left as viewed in FIG. 2. But pattern 12A is not symmetrical with respect to any given domain wall because of its wedge shape. Thus if any given domain is alternatively expanded and contracted, the wall thereabout moves in a manner to maximize the amount of overlay still coupled thereto. The varying magnetic field, then, although it causes alternating expansion and contraction, does so in only a selected propagation channel where a superimposed pattern results in unidirectional movement.

Figure 3A:
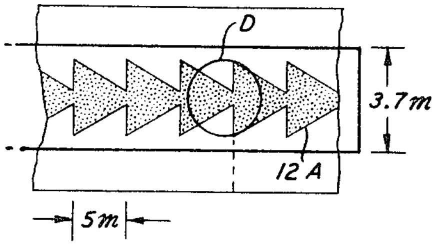
Figure 3B:
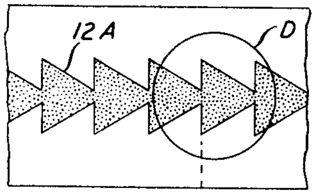
Figure 3C:
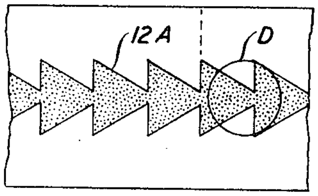

The mechanism for unidirectional movement of domains is explained further in connection with FIGS. 3A, 3B, and 3C. Let us assume that a domain D is stable in the position shown for it in FIG. 3A where the maximum amount of the wall thereabout overlies material of pattern 12A. The magnetic field is at a relatively high negative intensity indicated by the double minus sign in FIG. 3A. The field now goes positive (viz less negative) as indicated by the single minus sign in FIG. 3B. The domain, in response, expands. But, if the domain expands to the right, as viewed, the wall thereabout couples gradually less of the material of pattern 12A. On the other hand, if the domain expands to the left, the wall must abruptly decouple the material of pattern 12A over a relatively large portion of the wall length. Naturally, the former alternative is energetically preferred and the (forward) wall expands to the position shown in FIG. 3B.

The magnetic field now goes more negative as indicated by the double minus sign in FIG. 3C. The domain contracts. In this case, however, the left (trailing) portion of the wall decouples gradually less and less of the material of pattern 12A as it moves to the right. But, now the right-hand side of the wall must decouple the material of pattern 12A over a relatively large portion of its length in order to move to the left as viewed. Consequently, the domain contracts by the movement of the left side of the wall to the right into the position shown in FIG. 3C. The cycle now repeats, each time expanding and contracting the domain resulting in a net movement of the domain to the right as shown.

The input pulses are synchronized with the magnetic field variations as has already been mentioned. Next consecutive domains, however, occupy positions spaced, illustratively, two wedges apart as shown in FIG. 1. Such a positioning of domains corresponds to an input synchronized with every third alternation of the varying magnetic field. In the absence of such a pulse, of course, the corresponding bit position remains unoccupied representing a stored zero.

The stored bits reach the output position of a selected propagation channel consecutively as further alternations of the magnetic field are provided. The presence and absence of domains at that position is detected by utilization circuit 17 in synchronism with the magnetic field alternations under the control of control circuit 19. The output loop 16A, advantageously of a figure 8 configuration, exhibits a current pulse if a wall passes thereby. A synchronizing pulse concurrently enables circuit 17 thus permitting the passage of a domain to be recorded indicating a binary one. In an alternative mode of operation, interrogate conductors 41*i*, shown for channel A only, may be pulsed to collapse domains at an output position thus generating a pulse in conductor 16A if a domain were present in the corresponding output position. Conductors 14*i* are connected to an interrogate pulse source 42. Source 42, in turn, is connected to control circuit 19.

Faraday or Kerr optical effects permit optical detection of the presence and absence of domains in a well-known manner also.

Figure 4A:
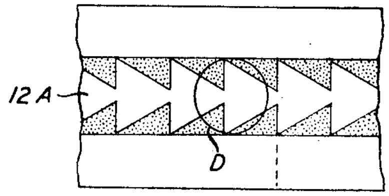

FIG. 4A shows an alternative configuration for patterns 12*i* which configuration is the negative of that shown in FIG. 3A. Whereas the wedge-shaped patterns define the areas of high permeability material in FIG. 3A, they define the areas from which high permeability material is absent in FIG. 4A. The patterns are provided by well-known deposition and photoresist techniques.

Figure 4B:
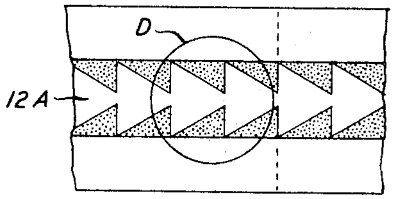
Figure 4C:
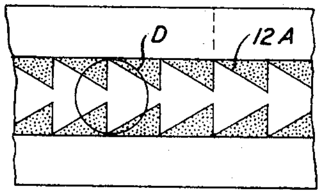

The propagation of domains in a device employing the alternative patterns is also in response to a varying magnetic field as described above. But movement of domains is to the left as viewed in FIG. 4A rather than to the right in response to that varying field. The consecutive positions for a domain D in response to one alternation of the varying field are depicted in FIGS. 4A, 4B, and 4C. It is clear that although the alternation of the field powers the movement of domains, that movement is made unidirectional by the patterns 12*i*.

The patterns which determine unidirectional movement of domains are conveniently shaped to correspond to the shape of a domain wall. It has been stated that the forward portion of a wall of a moving domain should move over gradually less of the material of patterns 12*i* while the trailing portion of the wall should abruptly decouple the pattern over a major portion during an expand portion of the propagation cycle. Consequently, each wedge shape of patterns 12*i* provides better and better margins the more closely it conforms to the curvature of the domain walls as shown in the above-mentioned copending application.

The invention has been described in terms of a plurality of propagation channels oriented along horizontal axes. But a prime virtue of single wall domains is that they can be moved in any direction in sheet 11. It is, therefore, possible to move a domain in any channel in FIG. 1 along, illustratively, an axis perpendicular to the ones shown.

Figure 5:
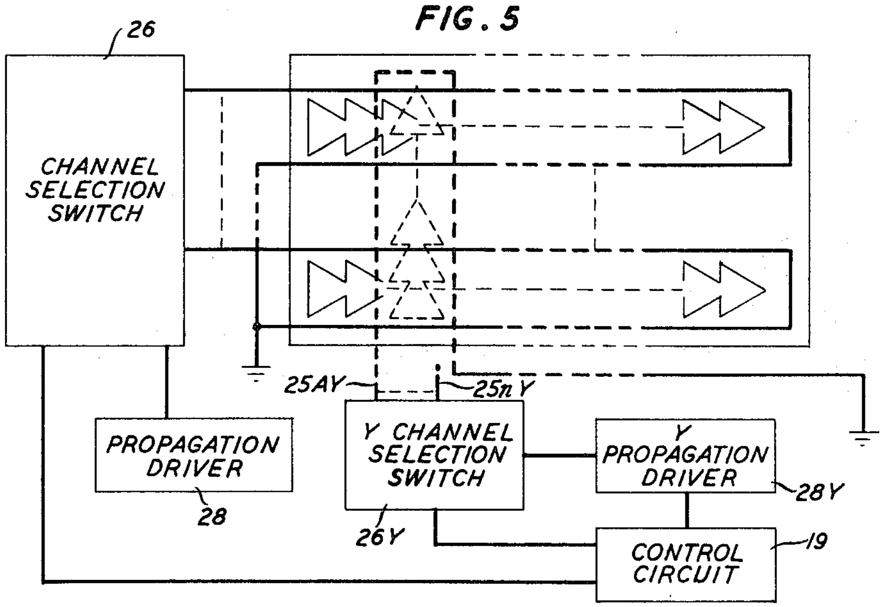
FIGS. 5, 6, and 7 are schematic views of alternative memory arrangements in accordance with this invention.
Figure 6:
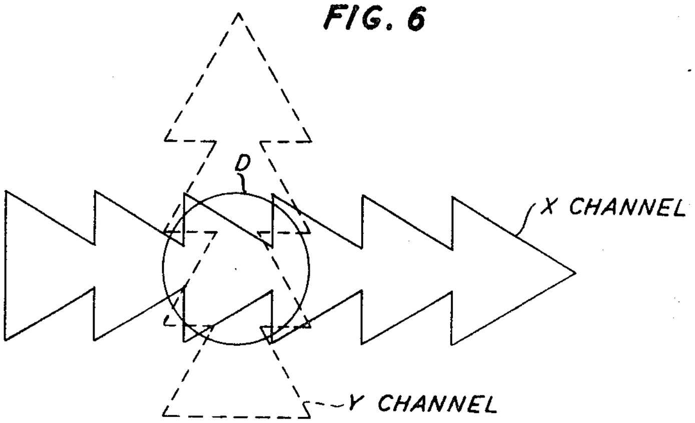

Movement in two dimensions is realized by depositing on the surface of sheet 11, opposite to that on which patterns 12*i* are deposited, a second set of overlay patterns. But the second set of patterns is oriented perpendicular to the orientations of patterns 12*i*. The arrangement is exactly the same as that shown in FIG. 1 but rotated 90 degrees. FIGS. 5 and 6 show how the wedge-shaped overlays "cross" one another. The domain D as shown in FIG. 6 when contracted sits symmetrically with respect to a wedge in each of the X and Y channels at an intersection.

The second set of patterns, of course, defines a set of Y oriented unidirectional domain propagation channels. About each of these channels is a hairpin conductor identical to those shown in FIG. 1. These hairpin conductors, designated 25*i*Y, are connected between a second (Y) selection switch designated 26Y and ground. Switch 26Y is connected to a Y propagation driver 28Y, and both switch 26Y and driver 28Y are connected to control circuit 19, as are corresponding elements as shown in FIG. 1. Of course, input and output positions (not shown) may be defined for each Y channel as discussed in connection with FIG. 1.

Thus, each single wall domain in sheet 11 of FIG. 1 finds itself always in both an X and a Y oriented propagation channel and can be propagated along either one by selecting the proper X or Y oriented hairpin conductor for generating the varying field for expansion and contraction of domains. The overlay pattern in the unselected channel at each intersection may be made to affect the movement of domains only negligibly as can be seen from FIG. 6. A two-dimensional shift register is provided having many of the capabilities of the two-dimensional shift registers described for example in copending application Ser. No. 579,931, filed Sept. 16, 1966 for A. H. Bobeck, U. F. Gianola, R. C. Sherwood, and W. Shockley (now Pat. 3,460,116).

Figure 7:
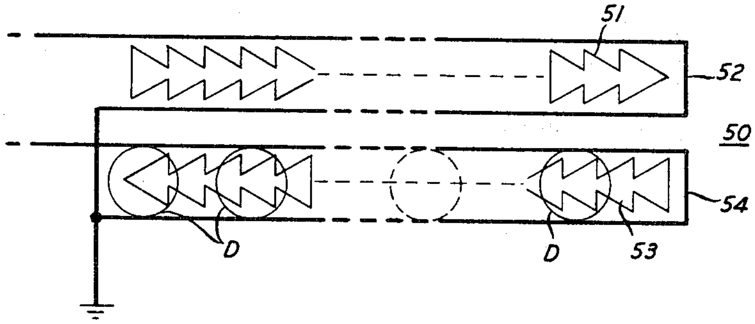

Still, the movement of a domain in a propagation channel, whether oriented along an X or a Y axis, is unidirectional. FIG. 7 shows an overlay configuration for the movement of a domain in either direction in a composite bidirectional channel 50. The portion of the channel defined by overlay wedges 51 and hairpin conductor 52 is identical to a channel, such as A, in FIG. 1. The portion of the channel defined by overlay wedges 53 and hairpin conductor 54 is reversed. That is to say, the wedges 53 are oriented opposite to the wedges 51 and thus permit movement of a domain to the left as viewed whereas wedges 51 permit movement to the right. Although the two portions of channel 50 may be thought of as two adjacent unidirectional channels, the operation thereof indicates the single channel bidirectional nature of the arrangement.

Consider the movement to the right of the information, 11 . . . 0 . . . 1 as shown in FIG. 1, through the portion of channel 50 defined by wedges 51 and conductor 52. This operation proceeds exactly as described hereinbefore. If the signal on conductor 51 is terminated and the signal is now applied to conductor 54, all the information will move downward as shown in FIG. 7 to corresponding positions with respect to wedges 53. Such movement is in response to the attracting field generated by currents in conductor 54 as is consistent with the teaching of the above-mentioned Bell System Technical Journal article. Now, however, the information moves to the left rather than the right. The two portions of channel 50 thus constitute a single bidirectional channel which can be organized in a manner similar to that shown in FIG. 1 or in FIG. 5. Conductors 52 and 54 of FIG. 7 may share a common ground between wedge patterns 51 and 53, in which case the currents in those conductors are poled opposite to one another. Input and output positions may be provided as desired.

Of course a (serial) recirculating channel may be defined by arranging the wedges, of say FIG. 1, tail-in-mouth fashion and encompassing the arrangement by a single hairpin conductor.

The following experimental data was obtained with an embodiment of the type shown in FIGS. 1 and 3A. A wedge-shaped pattern of permalloy, 5,000 A. thick was deposited on glass. The wedges were five mils on center, each wedge just barely intersecting the next adjacent one. The hairpin conductor was of two mil diameter wire, the forward and return path being spaced 3.7 mils apart as shown in FIG. 3A. A bias field of 12 oersteds was maintained uniformly through the sheet. The current in the selected hairpin conductor was varied between 235 milliamperes (ma.) and 10 ma. causing a corresponding expansion and contraction of domains from between one and two times the preferred diameter when such a current is absent. In response, domains having preferred diameters of about 5 mils were moved in a sheet of lutetium orthoferrite at a 50 kilocycle rate.

In another illustrative operation, a bias field of 10 oersteds was maintained and the current in the hairpin wire was varied between 240 ma. and 70 ma. In response, the domains moving along the selected wedge-shaped pattern varied from between two and three times the preferred diameter.

In general, bit locations occupy three times the diameter of a domain. Thus, for domains of say three microns, ten microns may be allocated for each bit location.

What have been described are considered merely illustrative of the principles of this invention. Accordingly, other and varied modifications may be made therein by one skilled in the art without departing from the spirit and scope of this invention.

What is claimed is:

1. In combination, a sheet of magnetic material in which single wall domains can be moved, means for defining first unidirectional propagation channels in said sheet for single wall domains alternately expanded and contracted, said last-mentioned means comprising means having an asymmetric geometry and being disposed to couple domains so expanded and contracted for causing a net displacement thereof in said sheet, and means for generating in selected ones of said channels a varying field for alternately expanding and contracting domains there.

2. A combination in accordance with claim 1 wherein said sheet comprises a material having a preferred direction of magnetization normal to the plane of said sheet.

3. A combination in accordance with claim 1 also including means for generating in said sheet a substantially uniform bias field for maintaining a preferred diameter for domains in said sheet.

4. A combination in accordance with claim 3 wherein said means for defining said first unidirectional propagation channel comprises a first layer of magnetic material contiguous said sheet at a first surface thereof, said first layer of magnetic material defining a repetitive pattern along each of said channels, said pattern being of a geometry to permit gradual decoupling between the walls of domains in said sheet and said first layer for domain movement in one direction along said channel and abrupt decoupling for said walls for domain movement in the opposite direction along said channel.

5. A combination in accordance with claim 4 wherein said first layer of magnetic material comprises high permeability material.

6. A combination in accordance with claim 4 wherein said first layer of magnetic material comprises a magnetic material having a coercive force sufficiently low to permit the material to be reset by the external fields characteristic of a domain in said sheet.

7. A combination in accordance with claim 4 wherein said means for generating comprises a plurality of first electrical conductors each encompassing one of said repetitive patterns and means for applying signals to said electrical conductors selectively.

8. A combination in accordance with claim 4 including means for selectively providing single wall domains in said sheet and means for detecting the presence and absence of domains in said sheet.

9. A combination in accordance with claim 7 wherein said plurality of first electrical conductors is aligned contiguous a first face of said sheet along a first axis.

10. A combination in accordance with claim 1 also including means for defining second unidirectional propagation channels transverse to said first unidirectional propagation channels.

11. A combination in accordance with claim 9 also including means for defining second unidirectional propagation channels substantially perpendicular to said first unidirectional propagation channels, said last-mentioned means comprising a second layer of magnetic material contiguous said sheet at a second surface thereof, said second layer of magnetic material defining repetitive patterns along channels of propagation for domains, each of said patterns being of a geometry to permit gradual decoupling between the wall of domains in said sheet and said second layer for domain movement in one direction along said channel and abrupt decoupling for domain movement in the opposite direction along said channel.

12. A combination in accordance with claim 11 wherein said means for generating also includes a plurality of second electrical conductors encompassing each of said second unidirectional propagation channels and means for applying signals to said second electrical conductors selectively.

13. A combination in accordance with claim 4 wherein each of said first propagation channels is defined by substantially parallel first layers each having a repetitive pattern permitting unidirectional movement of domains in a first or a second direction in each channel, and means for moving information from one to another of said first layers in selected channels.

14. A combination in accordance with claim 11 wherein each of said first and second propagation channels is defined respectively by substantially parallel first layers and substantially parallel second layers each having a repetitive pattern for permitting unidirectional movement of domains in a first or a second direction in each channel, and means for moving information from one to another of said first layers or said second layers in selected channels.

References Cited

UNITED STATES PATENTS 3,438,016 4/1969 Spain -------------- 340—174

JAMES W. MOFFITT, Primary Examiner